(12) United States Patent
Ware et al.

(10) Patent No.: US 8,913,746 B2
(45) Date of Patent: Dec. 16, 2014

(54) WIRELESS COMMUNICATION SYSTEM AND METHOD

(75) Inventors: Gary Ware, Newton, MA (US); John R. Van Hook, Dighton, MA (US); Tiegeng Ren, Wakefield, RI (US)

(73) Assignee: Schneider Electric IT Corporation, West Kingston, RI (US)

( * ) Notice: Subject to any disclaimer, the term of this patent is extended or adjusted under 35 U.S.C. 154(b) by 993 days.

(21) Appl. No.: 12/976,352

(22) Filed: Dec. 22, 2010

(65) Prior Publication Data

US 2012/0163599 A1 Jun. 28, 2012

(51) Int. Cl.
*H04K 1/00* (2006.01)
*H04W 12/08* (2009.01)
*H04W 84/18* (2009.01)

(52) U.S. Cl.
CPC .............. *H04W 12/08* (2013.01); *H04W 84/18* (2013.01)
USPC ........................................................ 380/270

(58) Field of Classification Search
None
See application file for complete search history.

(56) References Cited

U.S. PATENT DOCUMENTS

| | | | |
|---|---|---|---|
| 6,711,264 B1 * | 3/2004 | Matsumoto et al. | 380/283 |
| 2003/0232598 A1 | 12/2003 | Aljadeff et al. | |
| 2004/0242197 A1 | 12/2004 | Fontaine | |
| 2005/0063542 A1 | 3/2005 | Ryu | |
| 2005/0192896 A1 * | 9/2005 | Hutchison et al. | 705/40 |
| 2007/0019569 A1 | 1/2007 | Park et al. | |

FOREIGN PATENT DOCUMENTS

WO 2010023619 A1 3/2010

OTHER PUBLICATIONS

Texas Instruments Incorporated, "A True System-on-Chip Solution for 2.4 GHz IEEE 802.15.4 and ZigBee Applications," CC2530F32, CC2530F64, CC2530F128, CC2530F256, Apr. 2009—Revised Feb. 2011, www.ti.com, pp. 36.
Baronti et al. "Wireless Sensor Networks: A Survey on the State of the Art and the 802.15.4 and ZigBee Standards". Computer Communications, Elsevier Science Publishers B.V. Amsterdam, NL. vol. 30, No. 7. Apr. 8, 2007. pp. 1655-1695.
Chen et al. "Analysis of the Key Agreement Scheme of ZigBee Standard". E-Business and Information System Security (E-BISS), 2010 2nd International Conference on IEEE, Pscataway, NJ USA. May 22, 2010.
International Search Report from corresponding PCT/US2011/063668 dated Mar. 20, 2012.

* cited by examiner

*Primary Examiner* — Brandon Hoffman
(74) *Attorney, Agent, or Firm* — Lando & Anastasi, LLP

(57) ABSTRACT

A method of commissioning wireless network devices in a communication network includes assigning a user-defined number to a wireless network device. The method further includes generating, by the wireless network device, an identification number based on the user-defined number using a first hashing algorithm, generating, by the wireless network device, an encryption key based on the user-defined number using a second hashing algorithm, and transmitting, by the wireless network device, a message that is encrypted using the encryption key for joining the wireless network device to the communication network. The user-defined number is to be provided by a user using an input device that is coupled to, or integral to, the wireless network device.

20 Claims, 3 Drawing Sheets

WIRELESS COMMUNICATION SYSTEM AND METHOD

BACKGROUND OF THE INVENTION

1. Field of the Invention

Embodiments of the present invention relate generally to wireless communication systems, and more particularly, to commissioning wireless network devices through generation of ZIGBEE® Personal Area Network identification numbers (PANID) and encryption keys.

2. Discussion of Related Art

ZIGBEE® is a communication protocol specification that is based on the IEEE 802.15.4 standard for Low-Rate Wireless Personal Area Networks. These protocols are suitable for low power (e.g., battery powered) devices that utilize low data rate wireless communication. ZIGBEE® devices may form an ad hoc network having a mesh or star topology.

A ZIGBEE® network is formed by joining, or binding, two or more devices together in a Personal Area Network (PAN) as part of a process called commissioning. Commissioning a device includes defining a membership of the device within a specific network and joining the device in a logical connection (e.g., as defined by a routing) to other devices that are members of the network. Each device is assigned a PANID that is unique to the network, and optionally, an encryption key for facilitating secure communication between devices. In one conventional binding procedure, a "tool" is used to create the PANID and/or the encryption key. The PANID and/or the encryption key are subsequently uploaded to the device using the tool, either using a wired or wireless data connection. Examples of such a tool include a directional radio frequency (RF) device, push buttons, electrical contacts using a serial protocol, and a personal computer. After the PANID is uploaded to the device, the device contacts a network coordinator device with a request to join the network of which it is a member. A communication path between the device and at least one other device is established at the time the device joins the network. The device may be installed at a desired physical location after commissioning.

BRIEF SUMMARY OF THE INVENTION

According to one embodiment of the present disclosure, a method of commissioning wireless network devices in a communication network includes assigning a user-defined number to a wireless network device, generating an identification number based on the user-defined number using a first hashing algorithm and an encryption key based on the user-defined number using a second hashing algorithm, and transmitting a message that is encrypted using the encryption key for joining the wireless network device to the communication network. The user-defined number is to be provided by a user using an input device coupled to the wireless network device. The input device may be integrated with the wireless network device. According to another embodiment, assigning the user-defined number to the wireless network device includes selecting, by the user, at least one digit of the network number using the input device.

According to another embodiment, the wireless network device may receive, through the communication network, a parameter to be used by the first hashing algorithm for generating the identification number and/or the second hashing algorithm for generating the encryption key.

According to yet another embodiment, data transmitted by the wireless network device may be correlated with a characteristic of the wireless network device using an encoded portion of a Media Access Control (MAC) address of the wireless network device. The characteristic of the wireless network device may include a physical location of the wireless network device and/or a description of the wireless network device.

In another embodiment, the method may be practiced using at least two wireless network devices. The method may further include assigning the user-defined number to a second wireless network device and receiving, by the second wireless network device, the message transmitted by a first wireless network device. The second wireless device may be configured to determine if the user-defined number is assigned to the first wireless network device based on data contained in the message, and if so, may subsequently permit the first wireless network device to join the communication network.

In one embodiment, the wireless network device may be configured to be IEEE 802.15.4-compliant. In another embodiment, the identification number and/or the encryption key may be pseudo-random numbers. In another embodiment, the message includes the identification number and/or a Media Access Control (MAC) address of the wireless network device.

According to one embodiment, a communication system for a communication network includes a wireless network device, an input device coupled to the wireless network device and configured to enable a user to select a user-defined number to be associated with the wireless network device, and a controller coupled to the input device. The controller is configured to generate an identification number based on the user-defined number using a first hashing algorithm, generate an encryption key based on the user-defined number using a second hashing algorithm, and cause the wireless network device to transmit a message encrypted using the encryption key for joining the wireless network device to the communication network. In another embodiment, the controller may be further configured to receive a parameter to be used by at least one of the first hashing algorithm for generating the identification number and the second hashing algorithm for generating the encryption key.

In another embodiment, the system may include multiple wireless network devices. The system may include a second wireless network device associated with the user-defined number. The second wireless network device may be configured to receive the message and permit the first wireless network device to join the communication network based on data contained in the message. The data may identify the first wireless device as being assigned the user-defined number.

According to another embodiment, the message may include the identification number and/or a Media Access Control (MAC) address of the wireless device. In another embodiment, the identification number may include a 64-bit number, and the encryption key may include a 128-bit number.

According to yet another embodiment, the wireless network device may be configured to be IEEE 802.15.4-compliant. In another embodiment, the communication network is an ad hoc network.

According to one embodiment, a communication system for a communication network includes a wireless network device, an input device integral to the wireless network device and configured to enable a user to select a user-defined number, and means for generating, by the wireless network device, an identification number based on the user-defined number using a first hashing algorithm, and further generating an encryption key each based on the user-defined number using a second hashing algorithm. In another embodiment, the system may include means for receiving, by the processor, a parameter to be used by at least one of the first hashing algorithm for generating the identification number and the second hashing algorithm for generating the encryption key. In yet another embodiment, the system may include multiple wireless network devices. The system may include a second wireless network device associated with the user-defined number and wirelessly connected to the first wireless network device. The system may further include means for the second wireless network device to receive a message from the first wireless network device and permit the first wireless network device to join the communication network based on data contained in the message.

BRIEF DESCRIPTION OF THE DRAWINGS

In the drawings, each identical or nearly identical component that is illustrated in various figures is represented by a like numeral. For purposes of clarity, not every component may be labeled in every drawing. For a better understanding of the present disclosure, reference is made to the figures which are incorporated herein by reference and in which.

DETAILED DESCRIPTION OF THE INVENTION

Figure 1:
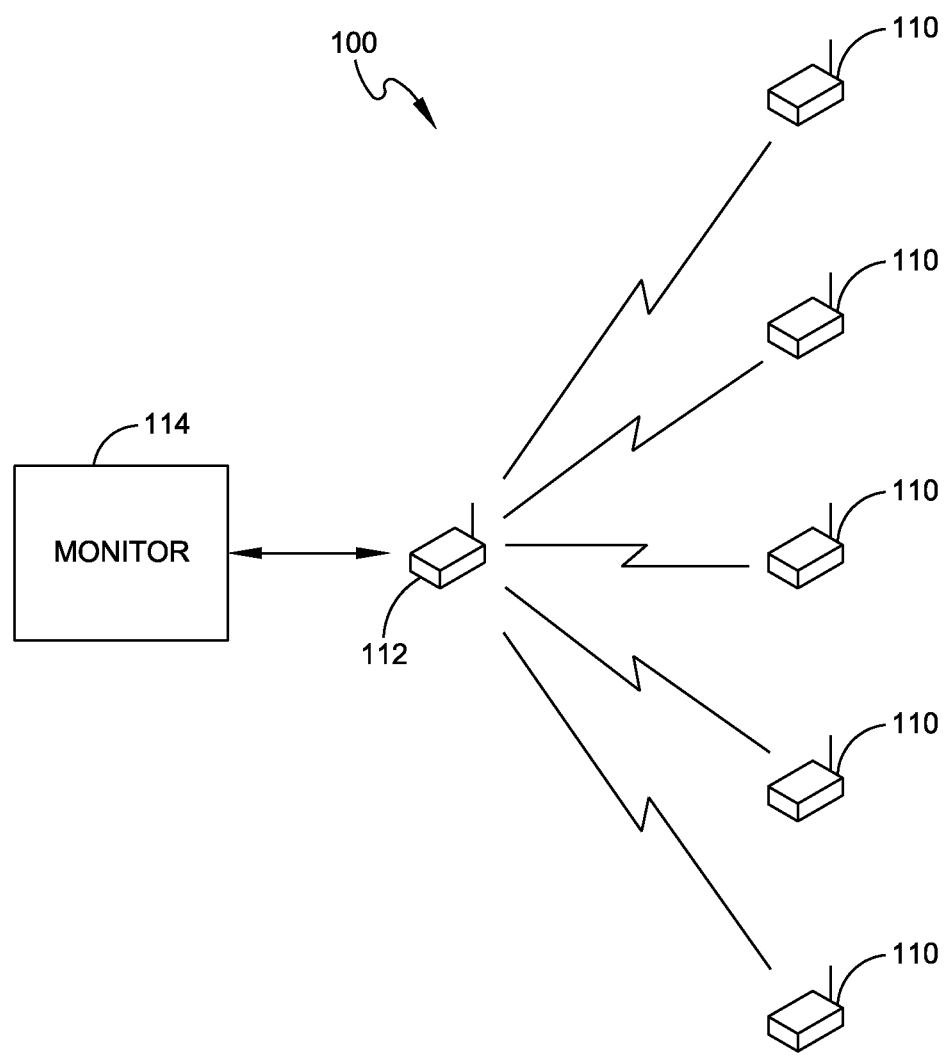
FIG. 1 illustrates a communication network in accordance with one embodiment of the disclosure.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The disclosure is capable of other embodiments and of being practiced or carried out in various ways. Also the phraseology and terminology used herein is for the purpose of description and should not be regarded as limiting. The use of "including," "comprising," "having," "containing," "involving," and variations thereof herein, is meant to encompass the items listed thereafter and equivalents thereof, as well as additional items.

It is appreciated that various embodiments of the present disclosure provide advantages over conventional techniques, in particular, for commissioning low-power wireless network devices on a communication network. In one conventional method of commissioning a plurality of wireless network devices, a coordinator device is first powered on. Each of the network devices is then powered on and loaded with an identification number (e.g., a PANID) and an optional encryption key, each of which are generated by another device, such as a software tool running on a personal computer. Typically, the wireless network devices include a user interface, such as a pushbutton, which enables a user to interact and/or monitor the operation of the device, such as during commissioning of the device. For example, the device may transmit a command to the coordinator device in response to the user pressing the pushbutton. The coordinator device permits the wireless network device to join the network if it is assigned a corresponding PANID. One limitation of this conventional approach is that when the wireless network devices are deployed, the routes which were created when each device joined the network may no longer work correctly or optimally due to changes in distance relative to other devices in the network, or other factors. Another limitation of this conventional approach is that the wireless network device is configured after power is applied, making it difficult to configure when installed in hard-to-reach locations and increasing the possibility of improper configuration. Yet another limitation includes the use of a separate tool, which is undesirable, and further provides an opportunity to capture any over-the-air signals (e.g., between the configuration tool and the wireless network device), which may include the PANID and encryption key, by surreptitious surveillance. This may pose undesirable security vulnerabilities.

FIG. 1 illustrates a communication network 100 according to one embodiment of the disclosure. The communication network 100 is formed, at least in part, by a plurality of wireless network devices 110, a coordinator device 112, and a monitor device 114. Each of the wireless network devices 110 is configured to wirelessly communicate at least with the coordinator device 112. Optionally, each of the wireless network devices 110 may be configured to communicate with each other (not illustrated), such as in a peer-to-peer network. The monitor device 114 communicates with at least the coordinator device 112, although it should be understood that the monitor device may communicate directly with any of the wireless network devices 110 in the network 100. Further, it should be understood that the network 100 may include more than one monitor device 114. In some embodiments, the coordinator device 112 may act as a router to manage a flow of network traffic between the monitor device 114 and the wireless network devices 110. The monitor device 114 is any device, such as a personal computer, server, or other equipment, that is configured to monitor and/or manage the wireless network devices 110. Typically, the monitor device 114 consumes data provided by one or more of the wireless network devices 110, although certain the monitor device may also perform certain wireless network device management tasks (e.g., configuring a sleep period or a data reporting frequency, or other relevant functions).

In one embodiment, the wireless network device 110 may include or be coupled to one or more environmental sensors (such as a temperature or humidity sensor) located, for example, in a data center or electronic equipment room (EER). One exemplary function of the device 110 is to collect data from the sensor(s), and wirelessly transmit that data to the monitor device 114. The sensor(s) may be integral to the device 110, or the sensor(s) may be coupled to the device. Typically, the device 110 operates unattended after it is properly configured and commissioned on the network 100. Data collected by the wireless network device 110 is transmitted wirelessly to the monitor device 114 over the network. The data may include, but is not limited to, an identification number that is assigned to the wireless network device 110, a device type of the device 110, a media access control (MAC) address of the device 110, a manufacturing date of the device 110, a hardware and/or firmware revision number of the device 110, a serial number of the device 110, sensor data, device configuration data, device status data, and device control data. As shown in FIG. 1, the data may be routed to the monitor device 114 through the coordinator device 112, although it will be understood that other routings (not shown) are possible.

According to one embodiment, each wireless network device 110 is commissioned prior to communicating on the network 100. As will be described in further detail below, each wireless network device 110 is assigned a user-defined number, which is used by the device to generate an identification number (e.g., a PANID) and/or an encryption key. The identification number is associated with the network 100, and is also assigned to each device 110 within the network. In other words, all devices 110 that are assigned the same identification number may join the network 100. The encryption key is used to encrypt data and messages that are transmitted by the device. In one embodiment, the PANID may be 64 bits long and the encryption key may be 128 bits long, although these should be understood as a non-limiting examples. In another embodiment, the PANID and/or the encryption key may be pseudo-random numbers.

The coordinator device 112 coordinates commissioning of each wireless network device 110. The coordinator device 112 may be the same type and/or model as any of the wireless network devices 110, or it may be, for example, a special purpose device (e.g., a dedicated router). The coordinator device 112 may be the first device to join the network. Other wireless network devices 110 subsequently join the network by transmitting a message to the coordinator device 112 that includes the respective wireless network device's PANID. The coordinator device 112 uses the PANID to determine if the wireless network device 110 is a member of the same network as the coordinator device, and if so, permits the wireless network device to join the network 100. After the wireless network device 110 is joined to the network 100, one or more logical connections are formed between the wireless network device and other devices in the network (e.g., the monitor device 114 and/or other wireless network devices). The logical connections may be, for example, routings that define a path for transmitting data from one device to another within the network 100, as will be understood by one of skill in the art. After all of the wireless network devices 110 have joined the network 100, the coordinating functions of the coordinator device 112 may no longer be needed, and the coordinator device may be removed from the network, or it may continue to function as a router or it may function in a manner similar to any of the wireless network devices. In one embodiment, one or more of the wireless network devices 110 may function as the coordinator device 112 during network commissioning, although typically only one coordinator device is used.

Figure 2:
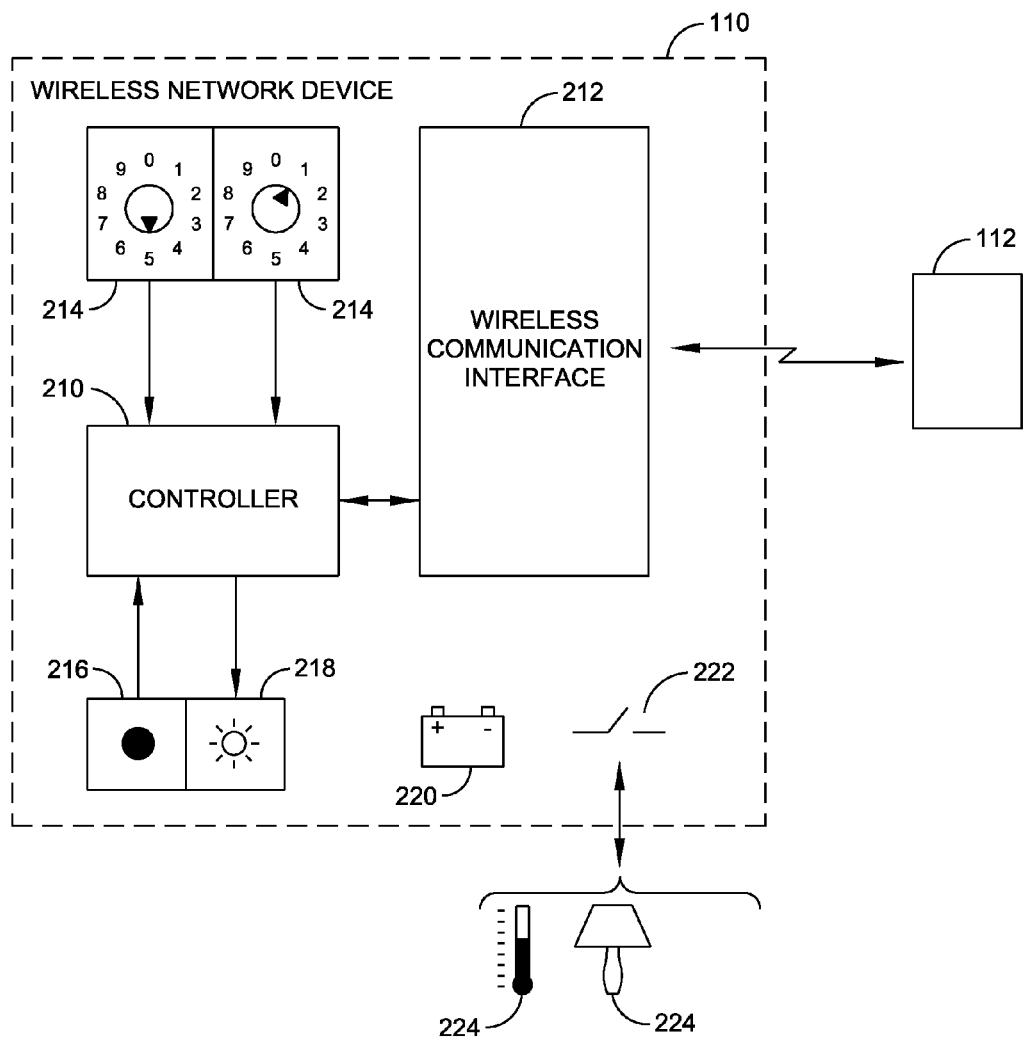
FIG. 2 illustrates a portion of a wireless network device in accordance with one embodiment of the present disclosure.

FIG. 2 illustrates a portion of the wireless network device 110 of FIG. 1, according to one embodiment of the present disclosure. The coordinator device 112 may be similar. The wireless network device 110 includes a controller 210, a wireless communication interface 212, selector switches 214, a user input 216 and a user output 218. The wireless network device 110 may also include a battery 220 for powering the device and one or more switches 222 or inputs. The wireless network device 110 is configured to communicate wirelessly with at least one other wireless network device, such as the coordinator device 112 of FIG. 1. The wireless network device 110 may, optionally, be coupled to an external device 224, such as a lamp, sensor, or other equipment that is to be monitored and/or controlled using the wireless network device. For example, the external device 224 may include a temperature sensor, part number AP9335T, or a humidity sensor, part number AP9335TH, each sold by American Power Conversion Corp. of West Kingston, R.I.

The controller 210 includes a processor that is configured to generate a PANID number and, optionally, an encryption key. The processor may, according to one embodiment, include a CC2530 integrated circuit chip that is tailored for IEEE 802.15.4, ZIGBEE®, ZIGBEE® RF4CE and Smart Energy applications, which is sold by Texas Instruments, Inc. (TI) of Dallas, Tex. Such a processor may include memory and a wireless radio, or the memory and wireless radio may be implemented as separate elements of the wireless network device 110. The PANID and encryption key are each generated by the controller 210 based on a user-defined number using one or more hashing algorithms. The user-defined number is assigned to the wireless network device 110 using the selector switches 214. In one embodiment, two ten-digit selector switches 214 are included in the wireless network device 110 and coupled to the controller 210. Each selector switch 214 is a rotary switch having ten positions, each position representing a digit 0, 1, 2, 3, 4, 5, 6, 7, 8, or 9. As will be described in further detail below, the selector switches 214 enable a user to provide the user-defined number at the wireless network device 110. It should be understood that other types of switches may be used, such as thumbwheel switches, slide switches, rocker switches, and dual-inline package (DIP) switches, among others, such that the user-defined number may be selected by the user. In at least some embodiments, the switches may be selectable without the use of any special tools except, for example, a small screwdriver to operate the switches. In one conventional technique, input devices, such as the selector switches 214 described above, are utilized to assign user-defined numbers to various devices for transmitter-receiver pairing (e.g., garage door openers having DIP switches on the transmitter and/or receiver); however, it is appreciated that various embodiments of the present disclosure provide advantages over this conventional technique by utilizing the user-defined number for data encryption and network joining functions, and for assigning network identification numbers to the wireless network devices.

In one embodiment, the user-defined number may be a "network" number that associates membership of the wireless network device 110 with the network 100 having a corresponding network number, such as described above with reference to FIG. 1. For example, all devices having a network number of "01" may be members of the same network, and therefore will be able to communicate wirelessly within the network once joined. The use of a two-digit network number allows the user to configure up to 100 separate networks. It should be understood that the network number may be any number of digits (e.g., one, two, three, and so forth) according to the application. Accordingly, in one example, the device 110 may include one or more selector switches 214 for selecting each digit of the network number. In another example, the device 110 may include a communication port (not shown), such as a Universal Serial Bus (USB) port, for connecting to an external device. The external device may be configured to provide a network number having any number of digits to the device 110 through the communication port.

The wireless communication interface 212 may include an RF transceiver and other equipment for transmitting and receiving a signal, as will be understood by one of skill in the art. As described above, the wireless communication interface 212 may be integrated into the controller 210, for example, by using the TI CC2530 system-on-chip for ZIGBEE® applications.

In one embodiment, the user input 216 may include an operator switch or similar device. The user input 216 may be used, for example, to signal the controller 210 to begin or restart the commissioning process for the device 110. One exemplary process is described below with respect to FIG. 3. The user output 218 may include a lamp (e.g., a light emitting diode (LED)) or other indicator device that provides feedback to the user during the commissioning and/or operation of the device 110. In one example, the user output 218 may drive the lamp to flash or illuminate steadily, which indicates that the commissioning process is active or complete, respectively. The user input 216 and user output 218 may be adapted for other uses according to the application, in particular, to enable the user to interact with and/or monitor operation of the device 110. As discussed above, the device 110 typically operates unattended after the device is commissioned; therefore, it is appreciated that a simple user interface for performing the commissioning process is desirable.

Figure 3:
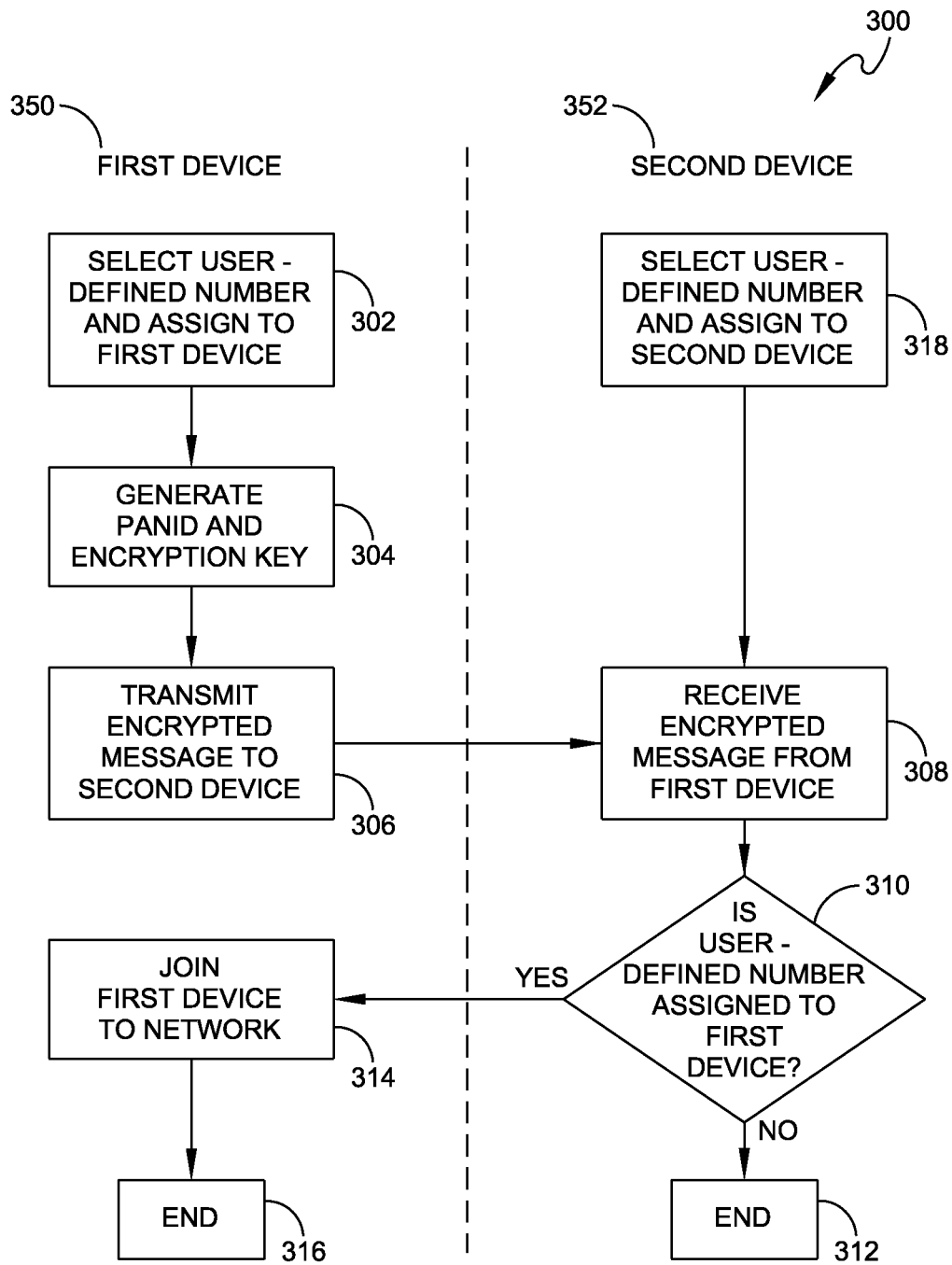
FIG. 3 is a flow diagram of a process for commissioning the wireless network device of FIG. 2 in accordance with one embodiment of the disclosure.

FIG. 3 illustrates a flow diagram of a process 300 for commissioning the wireless network device 110 of FIGS. 1 and 2 according to one embodiment of the disclosure. Portions of the process 300 may be performed by a first device 350 (e.g., the wireless network device 110), while other portions are performed by a second device 352 (e.g., the coordinator device 112). For clarity, the flow diagram of FIG. 3 is arranged to illustrate respective portions of the process 300 which are performed by the first device 350 and the second device 352, respectively.

At block 302, a user-defined number is selected by the user and assigned to the first device 350. The user-defined number may be selected, for example, using the selector switches 214 described above with respect to FIG. 2. At block 304, the first device 350 generates a PANID and, optionally, an encryption key based on the user-defined number. For example, the user-defined number is applied to one or more hashing algorithms, which in turn generate the PANID and encryption key. In this manner, the PANID and encryption key are generated internally by the first device 350 without the need for using a separate tool, such as conventional tools for generating and uploading or "pushing" the PANID onto the first device. Further, security of the PANID and encryption key is enhanced, since the encryption key, which may be used to encrypt data transmitted by the first device (including the PANID), is never disclosed by the device and therefore not discoverable by snooping or other surveillance techniques.

At block 306, a message, which optionally may be encrypted using the encryption key, is transmitted to the second device 352. The message may contain the PANID, which is based on the user-defined number, and a command to join the network. This information may be used by, for example, the second device 352 for permitting the first device 350 to join the network. At block 308, the message is received from the first device 350 by the second device 352. At block 310, the message is parsed by the second device 352, in particular to determine whether the user-defined number is assigned to the first device 350. For example, if the user-defined number is assigned to the first device 350, the message, and more particularly, the PANID, will contain information that may be used to identify such assignment. Further, the user-defined number is assigned to the second device 352, as shown at block 318, such that the first device 350 and the second device are assigned the same user-defined number. If the user-defined number is not assigned to the first device 350, process 300 ends at block 312. If the user-defined number is assigned to the first device 350, the first device is permitted to join the network, as shown at block 314, and process 300 subsequently ends at block 316.

According to one embodiment, one or more hashing algorithms are used by the controller 210 or another processor of the wireless network device 110 to generate the PANID and the encryption key. The hashing algorithms may be stored, for example, in a memory of the wireless network device 110 prior to shipping the device to a customer, or prior to placing the device into service. The hashing algorithms may be securely stored such that they are difficult to compromise (e.g., by reading or modifying the algorithms), which enhances the security of the PANID and encryption key.

In another embodiment, each of the hashing algorithms may be modified by providing one or more parameters (e.g., a 16-bit seed or polynomial coefficient that is applied to the algorithms) to the wireless network device 110. In one example, the parameters, when applied to the hashing algorithms, may cause the hashing algorithms to approximately emulate a cyclic redundancy check (CRC) polynomial hash function. The parameters may be transmitted wirelessly to the wireless network device 110 (e.g., from the monitor device 114) and stored, for example, in the memory of the wireless network device. The parameters may then be employed by the hashing algorithms for generating a new PANID and/or an encryption key that are different than the PANID and encryption key the algorithms generate without the parameters or with different parameters. In this manner, the hashing algorithms of each wireless network device 110 may be remotely modified without compromising the security of data transmitted over the communication network 100. In one example, the algorithms are configured such that the probability of independently determining the generated PANID and/or encryption key (e.g., by someone having access to the hashing algorithms) without knowledge of the parameters is approximately 1 in 65,000. Thus, it is appreciated that one advantage of this hashing algorithm modification technique is the PANID and/or encryption key may be renewed for each wireless network device 110 using the same hashing algorithms if confidentiality of the hashing algorithms is compromised or suspected of being compromised.

In one embodiment, a process of renewing the PANID and/or encryption key includes generating one or more parameters (e.g., a 16-bit seed or polynomial coefficient that is applied to the algorithms) and transmitting the parameters to each of the wireless network devices 110 in the communication network 100. The parameters may be stored in memory of each wireless network device 110 and applied to the hashing algorithms. After the parameters have been received by all of the wireless network devices 110, each device may be commissioned, such as described above with respect to FIG. 3. The commissioning process, using the parameters, causes each wireless network device 110 to generate a unique PANID and/or encryption key.

According to another embodiment, a four-character code is created for each wireless network device 110 based at least on the MAC address of the device. The code may include, for example, 20 bits of the MAC address that are encoded (e.g., base 32) into the four-characters. The code acts as a unique identifier of the device 110, such that other devices receiving messages from the device 110 can interpret the MAC address of the device 110 and, consequently, use the MAC address to associate the received message with the specific device that transmitted it.

According to various embodiments of the present disclosure, several advantages may be realized. For example, configuration of the wireless network devices is simplified by the use of a single user-defined number (e.g., a network number) for all devices. In another example, no separate configuration tool is necessary, since the wireless network device includes an integrated input device, such as a selector switch, which enables the user to select the user-defined number at the device, and also eliminates security vulnerabilities associated with over-the-air configuration. In another example, the commissioning process is simplified to a single user interaction (e.g., select the user-defined number and apply power) with each wireless network device, which is sometimes referred to as "one trip up the ladder." In yet another example, the encryption key generated by the wireless network device will never be known, in part because it is never transmitted over any communication pathway (e.g., wired or wireless). Further advantages may be realized.

According to one embodiment, data transmitted by the wireless network device may be correlated with a characteristic of the wireless network device using an encoded portion of a Media Access Control (MAC) address of the wireless network device. For example, the characteristic may be a physical location of the wireless network device, a description of the device or of a sensor coupled to the device, or other information that may be useful to a user for identifying the source or nature of any data that is transmitted by the device. In this manner, as data is received by, for example, the monitor device, the data can be associated by the monitor device with the respective sensors, switches, or other data-generating devices based on the MAC address of the wireless network device. The association may be based on a pre-defined configuration of the system, for example, where the identifying information for each wireless network device is provided by a user during network configuration and set-up (e.g., device #1 is associated with a temperature sensor in Room 402, device #2 is associated with a door switch in Room 402, and so forth). The identifying information may be provided to the monitor device so that it can make such associations automatically in response to receiving data from each wireless network device in the network.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, according to various embodiments, the wireless network device may be coupled to multiple sensors, including, but not limited to sensors of temperature, humidity, door contact/closure, motion, power, battery voltage, glass breakage, water, smoke, fire, carbon monoxide, carbon dioxide, Halon, and/or vibration. Further, it should be understood that the techniques described herein are not limited to wireless network applications utilizing ZIGBEE® or IEEE 802.15.4. Accordingly, the foregoing description and drawings are by way of example only.

What is claimed is:

1. A method of commissioning wireless network devices in a communication network, comprising:
   assigning a user-defined number to a wireless network device, the user-defined number to be provided by a user using an input device coupled to the wireless network device;
   generating, by the wireless network device, an identification number based on the user-defined number using a first hashing algorithm;
   generating, by the wireless network device, an encryption key based on the user-defined number using a second hashing algorithm; and
   transmitting, by the wireless network device, a message that is encrypted using the encryption key for joining the wireless network device to the communication network.

2. The method of claim 1, further comprising receiving, by the wireless network device through the communication network, a parameter to be used by at least one of the first hashing algorithm for generating the identification number and the second hashing algorithm for generating the encryption key.

3. The method of claim 1, further comprising correlating data transmitted by the wireless network device with a characteristic of the wireless network device using an encoded portion of a Media Access Control (MAC) address of the wireless network device.

4. The method of claim 3, wherein the characteristic of the wireless network device includes at least one of a physical location of the wireless network device and a description of the wireless network device.

5. The method of claim 1, wherein the wireless network device is a first wireless network device, and wherein the method further comprises:
   assigning the user-defined number to a second wireless network device;
   receiving, by the second wireless network device, the message transmitted by the first wireless network device;
   determining, by the second wireless device, that the user-defined number is assigned to the first wireless network device based on data contained in the message; and
   permitting the first wireless network device to join the communication network subsequent to determining that the user-defined number is assigned to the first wireless network device.

6. The method of claim 1, wherein the wireless network device is configured to be IEEE 802.15.4-compliant.

7. The method of claim 1, wherein assigning the user-defined number to the wireless network device includes selecting, by the user, at least one digit of the network number using the input device.

8. The method of claim 1, wherein each of the identification number and the encryption key is a pseudo-random number.

9. The method of claim 1, wherein the message includes at least one of the identification number and a Media Access Control (MAC) address of the wireless network device.

10. A communication system for a communication network, the communication system comprising:
    a wireless network device;
    an input device coupled to the wireless network device and configured to enable a user to select a user-defined number to be associated with the wireless network device; and
    a controller coupled to the input device, the controller configured to:
       generate an identification number based on the user-defined number using a first hashing algorithm;
       generate an encryption key based on the user-defined number using a second hashing algorithm; and
       cause the wireless network device to transmit a message encrypted using the encryption key for joining the wireless network device to the communication network.

11. The system of claim 10, wherein the controller is further configured to receive a parameter to be used by at least one of the first hashing algorithm for generating the identification number and the second hashing algorithm for generating the encryption key.

12. The system of claim 10, wherein the wireless network device is a first wireless network device, and wherein the system includes a second wireless network device associated with the user-defined number, the second wireless network device configured to receive the message and permit the first wireless network device to join the communication network based on data contained in the message.

13. The system of claim 12, wherein the data identifies the first wireless device as being assigned the user-defined number.

14. The system of claim 10, wherein the wireless network device is configured to be IEEE 802.15.4-compliant.

15. The system of claim 10, wherein the communication network is an ad hoc network.

16. The system of claim 10, wherein the message includes at least one of the identification number and a Media Access Control (MAC) address of the wireless device.

17. The system of claim 10, wherein the identification number includes a 64-bit number and wherein the encryption key includes a 128-bit number.

18. A communication system for a communication network, the communication system comprising:
- a wireless network device;
- an input device integral to the wireless network device and configured to enable a user to select a user-defined number; and
- means for generating, by the wireless network device, an identification number based on the user-defined number using a first hashing algorithm, and further generating an encryption key based on the user-defined number using a second hashing algorithm.

19. The system of claim 18, further comprising means for receiving, by the processor, a parameter to be used by at least one of the first hashing algorithm for generating the identification number and the second hashing algorithm for generating the encryption key.

20. The system of claim 18, wherein the wireless network device is a first wireless network device, wherein the system includes a second wireless network device associated with the user-defined number and wirelessly connected to the first wireless network device, and wherein the system further includes means for the second wireless network device to receive a message from the first wireless network device that is encrypted using the encryption key for joining the wireless network device to the communication network, and to permit the first wireless network device to join the communication network based on data contained in the message.

* * * * *